(12) United States Patent
Mayer et al.

(10) Patent No.: US 10,429,024 B2
(45) Date of Patent: Oct. 1, 2019

(54) RETAINING DEVICE FOR AN ELECTRONIC COMPONENT

(71) Applicant: ZKW GROUP GMBH, Wieselburg (AT)

(72) Inventors: Matthias Mayer, Mank (AT); Stefan Mitterlehner, Mank (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/078,109

(22) PCT Filed: Feb. 6, 2017

(86) PCT No.: PCT/AT2017/060021
§ 371 (c)(1),
(2) Date: Aug. 21, 2018

(87) PCT Pub. No.: WO2017/143372
PCT Pub. Date: Aug. 31, 2017

(65) Prior Publication Data
US 2019/0056080 A1 Feb. 21, 2019

(30) Foreign Application Priority Data

Feb. 24, 2016 (AT) .................................. 50128/2016

(51) Int. Cl.
*F21S 41/39* (2018.01)
*F21S 41/675* (2018.01)
(Continued)

(52) U.S. Cl.
CPC ............... *F21S 41/39* (2018.01); *F21S 41/36* (2018.01); *F21S 41/675* (2018.01); *F21S 45/47* (2018.01); *F21S 45/49* (2018.01); *G02B 26/0833* (2013.01)

(58) Field of Classification Search
CPC .......... F21S 41/30–39; F21S 45/47–49; G02B 26/0833
See application file for complete search history.

(56) References Cited

U.S. PATENT DOCUMENTS 7,794,115 B2    9/2010   Hellinger et al.
8,939,619 B2 *  1/2015   Shibata .................. B60Q 1/076
                                                362/460
(Continued)

FOREIGN PATENT DOCUMENTS

DE    102008031262 A1   1/2010
DE    102009049016 A1   4/2011
(Continued)

OTHER PUBLICATIONS

International Preliminary Report on Patentability for PCT/AT2017/060021, dated Jun. 8, 2018 (25 pages).
(Continued)

*Primary Examiner* — Mariceli Santiago
(74) *Attorney, Agent, or Firm* — Eversheds Sutherland (US) LLP

(57) ABSTRACT

A holding device (1) for an electronic component (2) in a vehicle headlamp, the electronic component (2) comprising an optical interface area on a front side and a thermal interface area and electrical contacts on a rear side facing away from the front side, as well as:
a base body (3) having a mounting position for the electronic component, and an opening (31) located in the region of the mounting position, through which opening access to the optical interface area of the electronic component (2) is possible, wherein the electronic component (2) bears by way of the front side thereof against the base body (3),
a circuit board (4), to which the electronic component (2) can be connected by means of the electrical contacts
(Continued)

Figure 1:
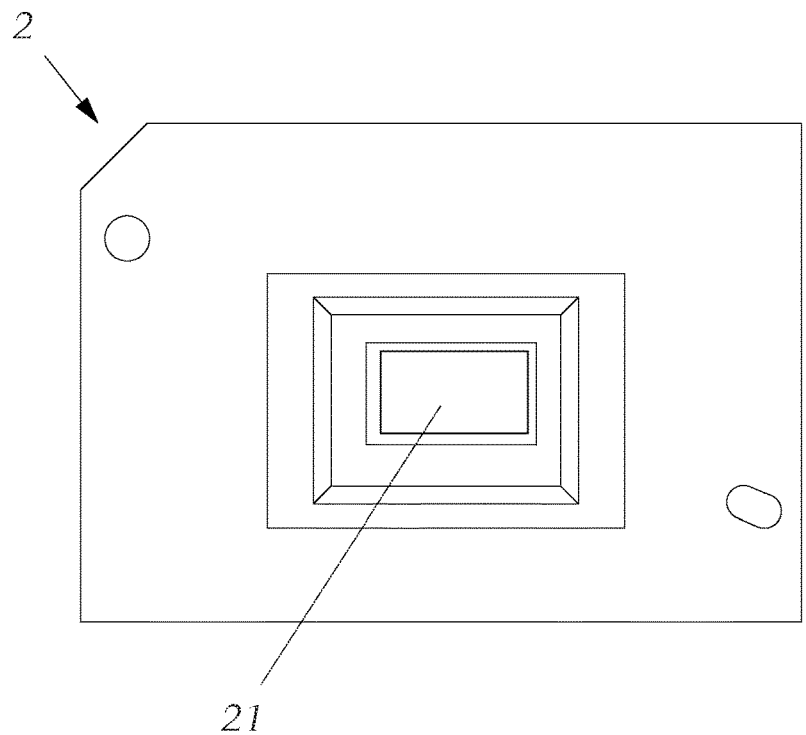

thereof and which has an opening (41), though which access to the thermal interface area of the electronic component (2) is possible, a heat sink (5), which is arranged on the thermal interface area of the electronic component (2) and can be fastened on the base body, at least one resilient spacer (6), which is arranged between the circuit board (4) and the base body (3).

6 Claims, 4 Drawing Sheets

(51) Int. Cl.
*F21S 45/49* (2018.01)
*F21S 45/47* (2018.01)
*F21S 41/36* (2018.01)
*G02B 26/08* (2006.01)

(56) References Cited

U.S. PATENT DOCUMENTS

| | | | |
|---|---|---|---|
| 9,046,258 B2 | 6/2015 | Singer et al. | |
| 9,255,702 B2 | 2/2016 | Singer et al. | |
| 2006/0146502 A1 | 7/2006 | Mayer | |
| 2006/0176453 A1 | 8/2006 | Miyamoto | |
| 2012/0127747 A1 | 5/2012 | Ahn | |
| 2012/0257400 A1* | 10/2012 | Shibata | B60Q 1/076 362/460 |
| 2015/0241018 A1* | 8/2015 | Williams | F21S 41/19 362/516 |
| 2015/0285455 A1* | 10/2015 | Sudahl | F21S 41/29 362/520 |
| 2017/0023203 A1* | 1/2017 | Sagisaka | F21S 41/29 |
| 2018/0299094 A1* | 10/2018 | Lin | F21S 43/14 |

FOREIGN PATENT DOCUMENTS

| | | |
|---|---|---|
| EP | 1630474 A2 | 3/2006 |
| EP | 2327926 A1 | 6/2011 |
| EP | 2975318 A1 | 1/2016 |
| JP | 2006133409 A | 5/2006 |
| JP | 2016024929 A | 2/2016 |

OTHER PUBLICATIONS

Office Action issued in Austrian Application No. A 50128/2016, dated Jan. 16, 2017 (2 pages).

Office Action in JP2018-542191, dated Jun. 11, 2019, pp. 1-3.

* cited by examiner

RETAINING DEVICE FOR AN ELECTRONIC COMPONENT

The invention relates to a holding device for an electronic component in a vehicle headlamp, the electronic component comprising an optical interface area on a front side and a thermal interface area and electrical contacts on a rear side facing away from the front side.

In the development of current headlamp systems, the desire is ever more prominent to be able to project the most highly resolved light image possible onto the carriageway, which can be changed quickly and adapted to the respective traffic, road and light conditions. The term "carriageway" is here used for simplified representation, as whether a light image is actually located on the carriageway or even extends beyond the same of course depends on the local conditions. In principle, the light image is described on the basis of a projection onto a vertical surface in accordance with the relevant standards, which relate to automotive lighting technology.

In order to comply with this mentioned requirement, headlamps were developed among others, in which a variably controllable reflector surface is formed from a plurality of micromirrors and reflects light emission, which is generated by a light source, in the radiation direction of the headlamp. Lighting apparatuses of this type are advantageous in vehicle manufacturing owing to the very flexible light distribution thereof, as the illumination intensity can be regulated individually for different lighting regions and any desired light distributions can be realized, such as for example a dipped-headlight light distribution, a swivelling-headlight light distribution, a city-light light distribution, a motorway-light light distribution, a cornering-light light distribution, a full-beam light distribution or the imaging of anti-glare full beam.

So-called digital light processing (DLP®) projection technology, in which the images are generated by a digital image being modulated onto a light beam, is used for the micromirror arrangement. In this case, the light beam is broken down into part regions by means of a rectangular arrangement of movable micromirrors, also termed pixels, and subsequently reflected, pixel-by-pixel, either into the projection path or out of the projection path.

An electronic component, which contains the rectangular arrangement in the form of a matrix of mirrors and the control technology thereof and is termed a "digital micromirror device" (DMD), forms the basis for this technology.

A DMD microsystem is a spatial light modulator (SLM), which consists of micromirror actuators arranged in a matrix-like manner, that is to say tiltable mirroring surfaces, for example with an edge length of approximately 16 µm. The mirror surfaces are constructed in such a manner that they can be moved by means of the action of electrostatic fields. The angle of each micromirror can be adjusted individually and generally has two stable end states, between which it is possible to change up to 5000 times within a second. The number of mirrors corresponds to the resolution of the projected image, wherein a mirror can represent one or more pixels. Meanwhile, DMD chips are available with high resolutions in the megapixel range. The technology on which the adjustable individual mirrors are based is micro-electromechanical systems (MEMS) technology.

Whilst the DMD technology has two stable mirror states and the reflection factor can be adjusted by modulation between the two stable states, the "analogue micromirror device" (AMD) technology has the property that the individual mirrors can be set in variable mirror positions, which are in a stable state there in each case.

A typical micromirror component comprises a housing, on the front side of which, the matrix of mirrors is arranged behind an optical viewing window. The optical interface area of such a micromirror component is understood to mean the active mirror surface of the component, that is to say the whole surface which is formed by all of the individual micromirrors. The electrical contacts are usually arranged on the rear side of the housing in an area ("electrical interface area") ringing a centrally located area which is provided for the connection of a cooling apparatus. The thermal interface area of such a micromirror component is understood to mean the area on the rear side of the component, which is provided for attaching a heat sink.

Often, the micromirror component is installed in a so-called ceramic land grid array (CLGA) module, a connecting system for integrated circuits. In the LGA system, the connections of the integrated circuit are realized on the underside thereof in the form of a chessboard-like field ("grid array") of contact areas ("land"). LGA processors are usually placed onto sockets which contain contacts realized in a resilient manner, which has the consequence of a lower mechanical loading of the contacts. The ceramic body of the CLGA is designed for high operating temperatures in particular.

In addition to the mechanical loading forces, which may arise during the mounting of the individual components, mechanical loading forces such as vibrations or tensile or pressure forces due to driving situations may arise when stationary or during the driving of the vehicle, which forces act on all components in the vehicle. There is therefore the requirement that the components are on the one hand configured such that mechanical loading forces do not have any influence on the function thereof or the arrangement thereof with respect to one another. On the other hand, the components must not be impaired with regards to stability or service life, as for example in the case of mechanical loading forces caused by high temperature differences owing to different material expansions of adjacent different materials for and inside the components.

One object of the present invention lies in creating a holding device for an electronic component in a vehicle headlamp, which supports the basic optical function of the vehicle headlamp by means of the electronic component used, and also allows the stable, mechanical fastening thereof and the connection of the optical, electrical and thermal system parts. In this case, it is to be taken into account that no mechanical loading forces may act on the connections. At the same time, a simple maintenance of the components should be enabled.

This object is achieved using a vehicle headlamp of the type mentioned at the beginning, in that the holding device comprises:

a base body having a mounting position for the electronic component, and an opening located in the region of the mounting position, through which opening access to the optical interface area of the electronic component is possible, wherein the electronic component bears by way of the front side thereof against the base body,
  a circuit board, to which the electronic component can be connected by means of the electrical contacts thereof and which has an opening, though which access to the thermal interface area of the electronic component is possible,

- a heat sink, which is arranged on the thermal interface area of the electronic component and can be fastened on the base body,
- at least one resilient spacer, which is arranged between the circuit board and the base body.

Access to an optical or thermal interface area means that the respective interface area can be reached through an opening either in the base body or in the circuit board or the electronic component can protrude through the opening by way of the interface area, in order to enable the effect of the interface area. The optical interface area creates its effect by means of the reflection of light, which is incident and is reflected again by means of the electronic component in accordance with the control. By means of the opening, it is ensured that the path of the incident and reflected light is not impaired. The thermal interface area creates its effect by means of the dissipation of heat which arises in the electronic component. To improve the effect, a heat sink may additionally be attached on the thermal interface area. On the one hand, the heat is brought about by the power loss of the electronics of the electronic component, but also by means of the light irradiated onto the optical interface area and not reflected.

By means of the holding device according to the invention, it is achieved that the electronic component is mounted in a manner suitable for the function of the vehicle headlamp, in addition can be cooled in a suitable manner and no loading forces mechanically act on the circuit board, as the circuit board is mounted in a resiliently realized manner. In addition, the assembly of the vehicle headlamp is very simple, as in each case a fine adjustment can be undertaken already when composing the individual components, in order to implement an alignment of the electronic component onto a light source or an imaging optic for example. All components are held together already by means of the connecting element, but can still be adjusted to a certain extent.

If the circuit board and heat sink are separate components from one another, the arrangement ensures that no mechanical loading forces act on the circuit board, but nonetheless a direct contact between heat sink and electronic component results for heat transport.

The reduction of the mechanical loading forces is also achieved in that only materials with similar material coefficients of expansion are directly rigidly connected to one another, and otherwise are only connected by resiliently realized connections.

If the circuit board and the base body are connected to one another, preferably by means of a connecting element, by means of the resilient spacer and held spaced apart, it is ensured that the resiliently realized spacer is secured against slipping during mounting, as the spacer is fixed around the connecting element as a ring, for example.

The connecting elements may be screws, but may also be plug connections, rivets, adhesively bonded connections or the like. Screws, as detachable and reusable connections, are simple when maintaining the holding device, on the other hand, plug connections, as fixed connections, have cost advantages.

If at least one second resiliently realized spacer is arranged between the circuit board and the heat sink, then the circuit board is fixed between two resiliently realized spacers and damped very well against vibrations of the headlamp.

By using an analogue or digital micromirror array as electronic component, a particularly advantageous embodiment of the optical function of the vehicle headlamp results.

In the holding device according to the invention, the mentioned opening in the base body enables access to the optical interface area of the electronic component, i.e. the matrix of mirrors in the component becomes visible for the further components of the lighting apparatus and the light irradiated by a light source can enter and exit through the opening and be reflected by means of the optical interface area.

The circuit board likewise advantageously comprises an opening, through which a heat sink can be extended and enables access to the thermal interface area of the electronic component, in order to attach a heat sink there.

Figure 2:
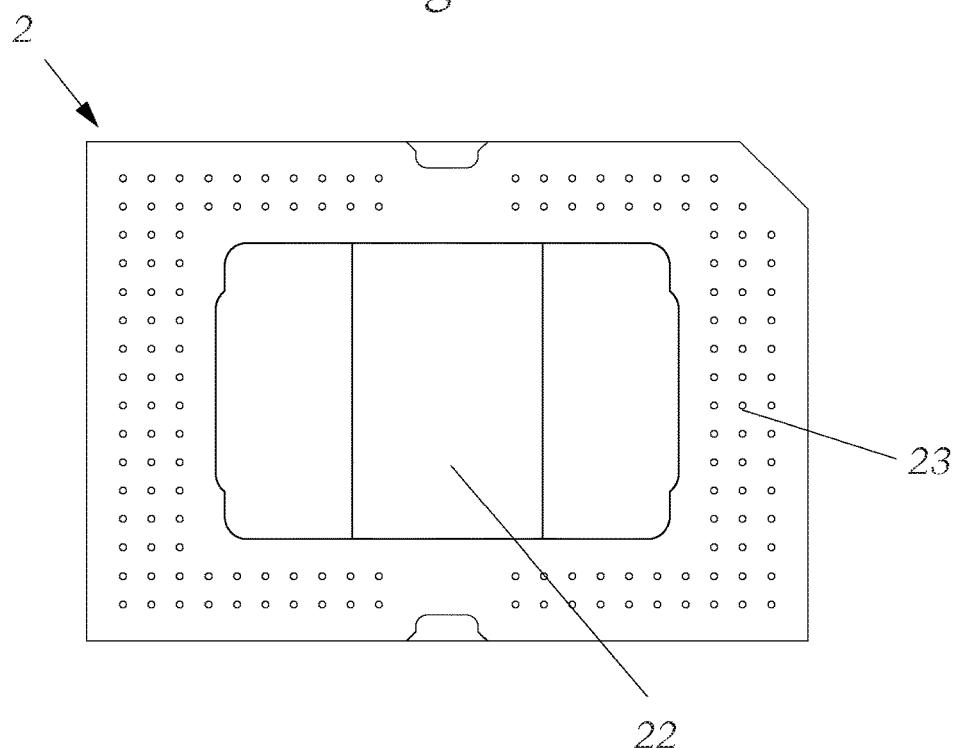
Figure 3:
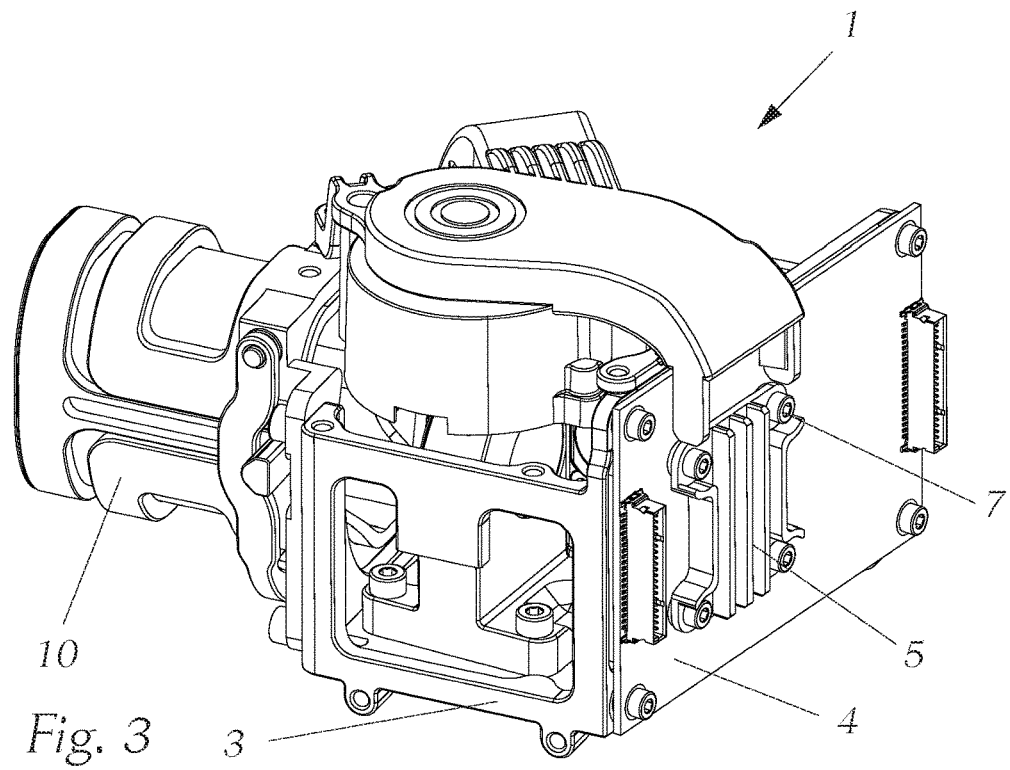
Figure 4:
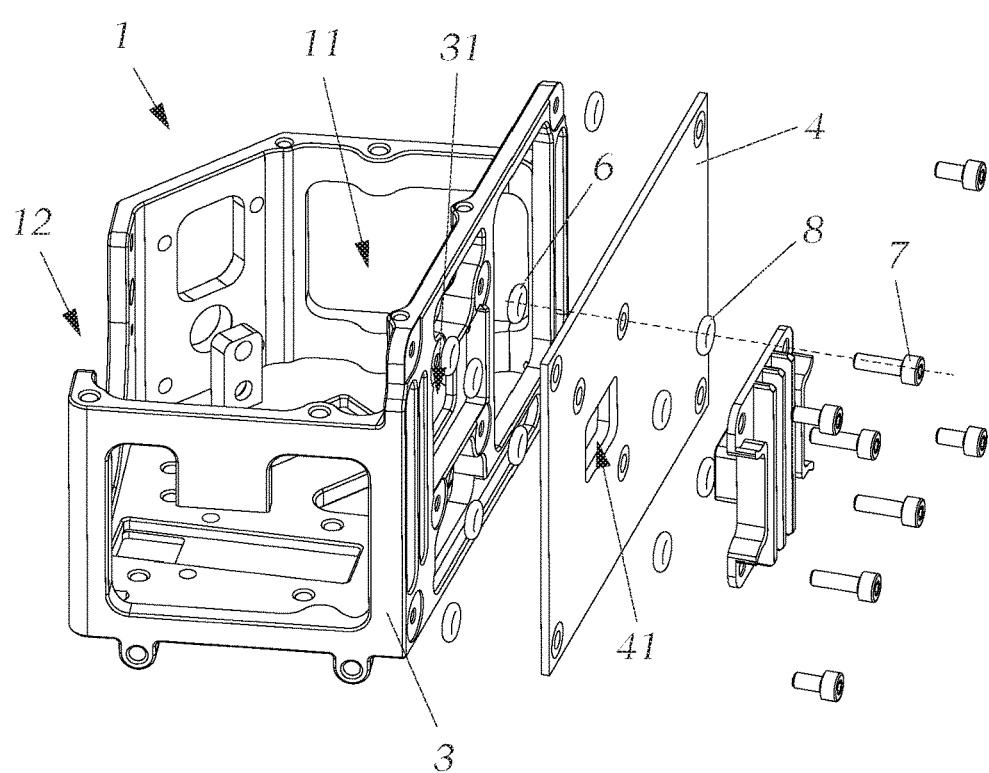
Figure 5:
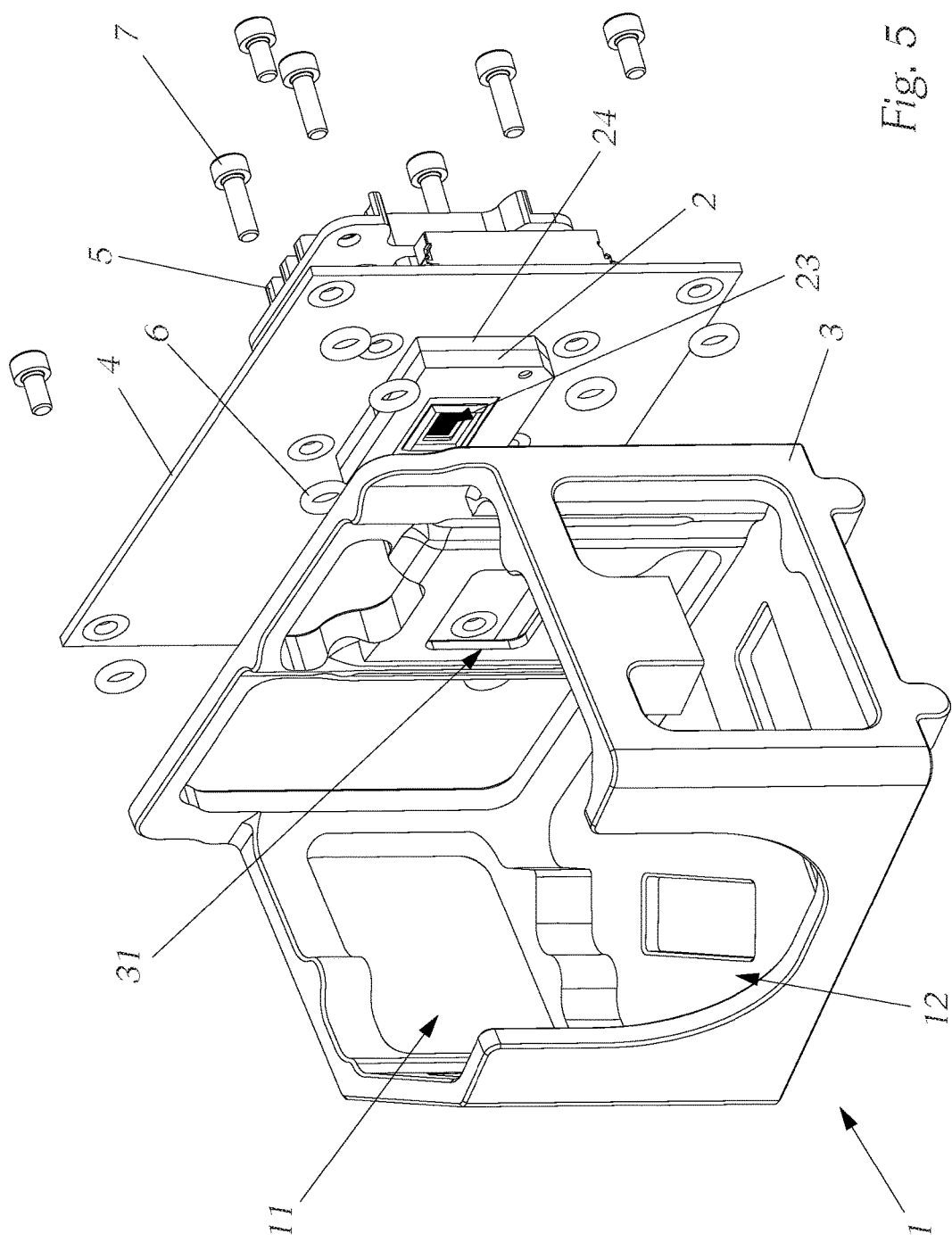
Figure 7:
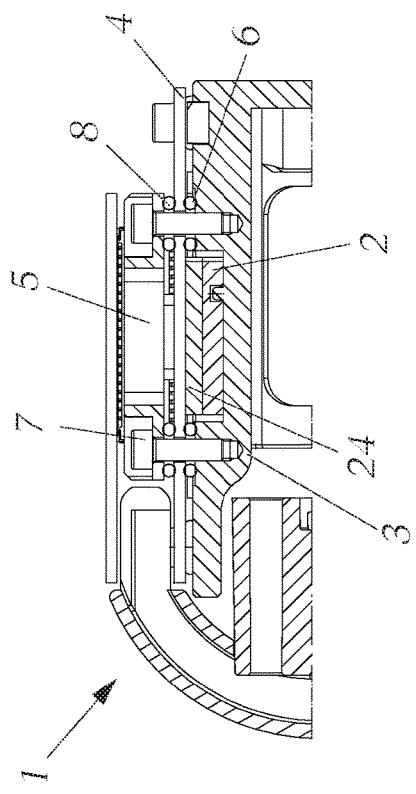
Figure 8:
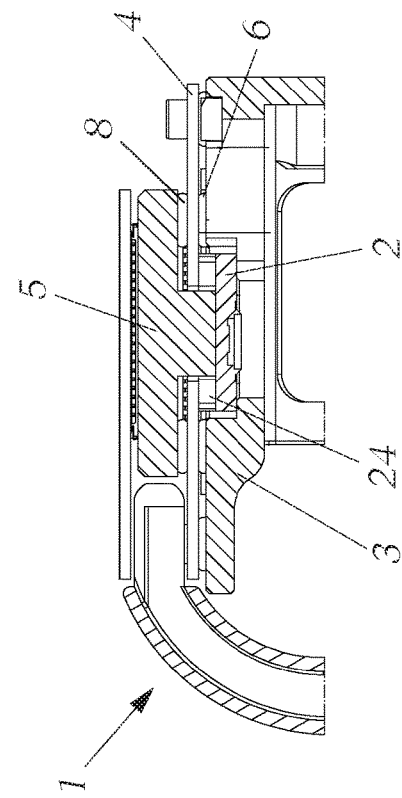
Figure 6:
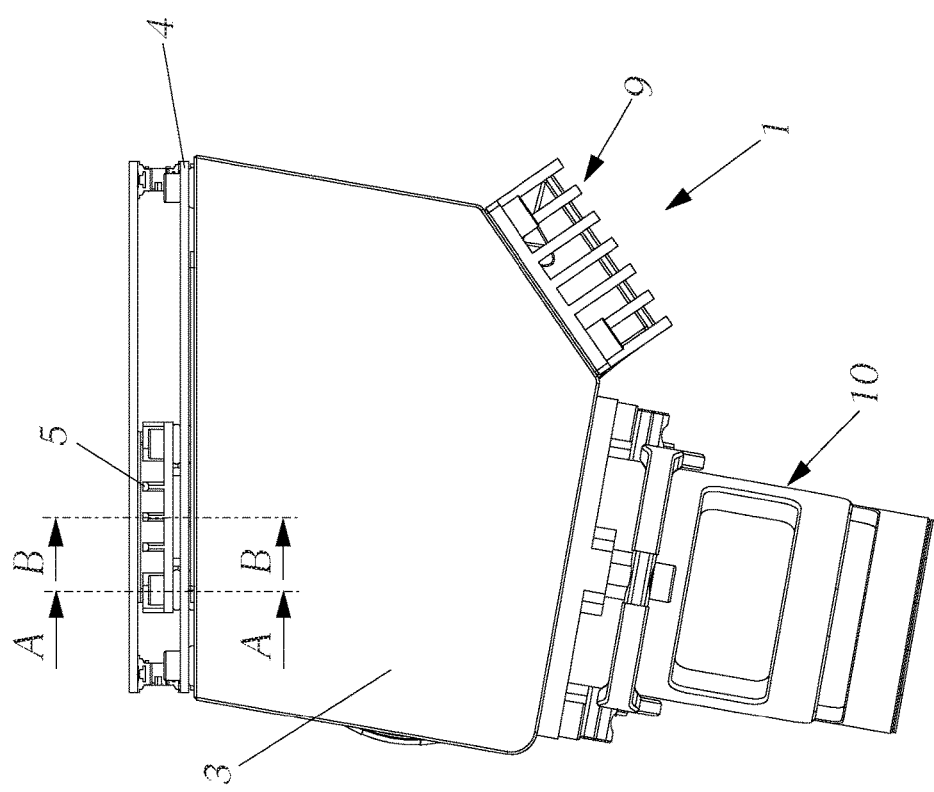

The invention and further advantages are described in more detail hereinafter on the basis of non-limiting exemplary embodiments, which are illustrated in the attached drawings. In the drawings:

FIG. 1 shows a view onto a chip upper side of an electronic component according to an exemplary embodiment of the invention in the form of a DLP chip, FIG. 2 shows a view onto a chip underside of the electronic component, FIG. 3 shows a perspective view of a first side of an exemplary embodiment of a vehicle headlamp with a holding device according to the invention, FIG. 4 shows an exploded view of the headlamp from the first side, FIG. 5 shows an exploded view of important components of the holding device of the headlamp from a second side, FIG. 6 shows a view from below onto the headlamp with the position of the sectional planes A-A and B-B, FIG. 7 shows the headlamp in a sectional view according to the sectional plane A-A of FIG. 6, FIG. 8 shows the headlamp in a sectional view in accordance with the sectional plane B-B of FIG. 6.

Exemplary embodiments of the invention are explained in more detail with reference to FIG. 1 to FIG. 8. In particular, important parts are illustrated in a headlamp, wherein it is clear that a headlamp contains many other parts, which are not shown, which allow a sensible use in a motor vehicle, such as a passenger car or motorcycle in particular.

In the figures, the components of a holding device 1 for an electronic component 2 in a vehicle headlamp are illustrated in overview and in various perspectives and sections. In the figures, only one representative reference number is entered for a respective component, even if the same component is realized multiple times.

In accordance with the invention, FIG. 1 and FIG. 2 show an electronic component 2 in the form of a digital micromirror array (DLP® chip). The electronic component 2 has an optical interface area 21 (micromirror array) on a front side and a thermal interface area 22 and electrical contacts 23 arranged in a ring-like manner on a rear side facing away from the front side.

Furthermore, adjustment holes can be seen. In this example, the electronic component 2 is an analogue or digital micromirror array.

The chip upper side and the chip underside in FIG. 1 and FIG. 2 respectively do not correspond to the views of the entire holding device according to FIG. 3 to FIG. 8.

The structure of the holding device 1 according to an exemplary embodiment is illustrated in FIG. 3 to FIG. 5.

The electronic component 2 is mounted on a base body 3, specifically in a mounting position provided therefor. The base body 3 has an opening 31 in the region of the mounting position, through which opening access to the optical interface area 21 of the electronic component 2 is possible. The access may for example be realized in such a manner that the electronic component 2 protrudes through the opening 31. As a result, the matrix of mirrors in the electronic component 2 becomes optically accessible or visible for further components of the lighting apparatus, which makes it possible that the light irradiated by a light source can be reflected by means of the optical interface area in the radiation direction of the headlamp. In addition, the electronic component 2 bears by way of the front side thereof against the base body 3.

A circuit board 4, to which the electronic component 2 can be connected by means of the electrical contacts thereof, has an opening 41, though which access to the thermal interface area 22 of the electronic component 2 is possible.

A heat sink 5 is arranged on the thermal interface area 22 of the electronic component 2 and can be fastened on the base body.

A plurality of spacers 6 realized of resilient type are arranged between the circuit board 4 and the base body 3. The spacers 6 can be realized in a ring-shaped manner, particularly a torus-shaped or hollow cylindrical manner. A plurality of connecting elements 7 fix the heat sink 5 on the base body 3. The connecting elements 7 are screws in this example, but may also be plug connections, rivets, adhesively bonded connections or the like. They additionally elastically connect the circuit board 4 to the base body 3 by means of spacers 6 realized of resilient type. In addition, second spacers 8 realized of resilient type are arranged between the circuit board 4 and the heat sink 5.

The electronic component 2 bears by way of the front side thereof against the base body 3 and is fixed to the connecting elements 7 and the heat sink 5. When using a screw as connecting element 7, a thread may be provided in the base body 3. In other words, the electronic component 2 is clamped between the base body 3 and the heat sink 5, wherein the clamping force is applied and the connection is produced by means of the connecting elements 7.

A projection optic module 10 can be fastened to the holding device 1, which module comprises a projection optic for beam formation. Furthermore, a light source opening 11 and a projection optic opening 12 is provided on the holding device 1, in order to bring a light source and a projection optic of a vehicle headlamp into an optical arrangement together with the electronic component 2. The projection optic of the vehicle headlamp can be fastened in the projection optic module 10, provided therefor, on the holding device 1. The light generated by the light source in a light source module 9 is radiated in the direction of the electronic component 2, in order to be reflected in the direction of the projection optic at the optical interface area 21.

FIG. 6 shows the holding device 1 with the base body 3 and the circuit board 4 and the heat sink 5 in a view from below with the position of sectional planes A-A and B-B. The sectional plane A-A runs through the connecting elements 7, the sectional plane B-B runs through the heat sink 5.

FIG. 7 shows a cross section of the holding device 1 in a sectional plane A-A of FIG. 6, wherein the sectional plane A-A runs through the connecting elements 7. The electronic component 2 is mounted on the circuit board 4 on a mounting socket 24. The circuit board 4 and the heat sink 5 are held on the base body 3 by means of the connecting elements 7 and the resilient spacers 6 and 8 at a defined spacing. The heat sink 5 is arranged on the rear side of the electronic component 2.

FIG. 8 shows a cross section of the holding device 1 in a sectional plane B-B of FIG. 6, wherein the sectional plane B-B runs through the heat sink 5. The heat sink 5 is fastened on the base body 3 by means of the connecting elements. It is possible to see how the heat sink 5 is arranged on the electronic component 2, wherein the heat sink 5 is plugged through the mounting socket 24. The resilient spacers 6 and 8 fix the circuit board 4 according to the invention in such a manner that no mechanical loading forces act on the same.

The following reference numbers are used below:
1 Holding device
2 Electronic component
21 Optical interface area of the electronic component
22 Thermal interface area of the electronic component
23 Electrical contacts of the electronic component
24 Mounting socket for the electronic component
3 Base body
31 Opening for the electronic component in the base body
4 Circuit board
41 Opening for the electronic component in the circuit board
5 Heat sink
6 First resilient spacer
7 Connecting element
8 Second resilient spacer
9 Light source module
10 Projection optic module
11 Light source opening
12 Projection optic opening

The invention claimed is:

1. A vehicle headlamp comprising:
a holding device (1) for an electronic component (2), the electronic component (2) comprising an optical interface area (21) on a front side and a thermal interface area (22) and electrical contacts (23) on a rear side facing away from the front side,
wherein the holding device comprises:
a base body (3) having a mounting position for the electronic component, and an opening (31) located in the region of the mounting position, through which opening access to the optical interface area (21) of the electronic component (2) is possible, wherein the electronic component (2) bears by way of the front side thereof against the base body (3),
a circuit board (4), to which the electronic component (2) can be connected by means of the electrical contacts thereof and which has an opening (41), though which access to the thermal interface area (22) of the electronic component (2) is possible,
a heat sink (5), which is arranged on the thermal interface area (22) of the electronic component (2) and is fastened on the base body, and
at least one resilient spacer (6), which is arranged between the circuit board (4) and the base body (3).

2. The vehicle headlamp according to claim 1, wherein the circuit board (4) and the base body (3) are connected to one another via the resilient spacer (6), and are held spaced apart.

3. The vehicle headlamp according to claim 1, wherein at least one second resilient spacer (8) is arranged between the circuit board (4) and the heat sink (5).

4. The vehicle headlamp according to claim 1, wherein the electronic component (2) is an analogue or digital micromirror array.

5. The vehicle headlamp according to claim 2, wherein the circuit board (4) and the base body (3) are connected to one another by a connecting element (7).

6. The vehicle headlamp according to claim 5, wherein the connecting element (7) is a screw or plug connection.

* * * * *